United States Patent
Tione (10) Patent No.: US 10,525,948 B2
(45) Date of Patent: Jan. 7, 2020

(54) PNEUMATIC BRAKING SYSTEM FOR A RAILWAY VEHICLE

(71) Applicant: FAIVELEY TRANSPORT ITALIA S.P.A., Piossasco (Turin) (IT)

(72) Inventor: Roberto Tione, Lauriano (IT)

(73) Assignee: FAIVELEY TRANSPORT ITALIA S.P.A., Piossasco (Turin) (IT)

( * ) Notice: Subject to any disclaimer, the term of this patent is extended or adjusted under 35 U.S.C. 154(b) by 0 days.

(21) Appl. No.: 15/747,238

(22) PCT Filed: Jul. 27, 2016

(86) PCT No.: PCT/IB2016/054473
§ 371 (c)(1),
(2) Date: Jan. 24, 2018

(87) PCT Pub. No.: WO2017/017617
PCT Pub. Date: Feb. 2, 2017

(65) Prior Publication Data
US 2018/0222461 A1 Aug. 9, 2018

(30) Foreign Application Priority Data
Jul. 28, 2015 (IT) ........................ 102015000038826

(51) Int. Cl.
*B60T 13/66* (2006.01)
*B60T 8/1761* (2006.01)
(Continued)

(52) U.S. Cl.
CPC .......... *B60T 8/1761* (2013.01); *B60T 8/1705* (2013.01); *B60T 8/4266* (2013.01); *B60T 13/665* (2013.01); *B60T 17/228* (2013.01)

(58) Field of Classification Search
CPC .... B60T 8/1705; B60T 8/1761; B60T 8/4266; B60T 13/665; B60T 13/683; B60T 17/228
See application file for complete search history.

(56) References Cited

U.S. PATENT DOCUMENTS 3,650,572 A    3/1972  McClure et al.
6,883,875 B2 * 4/2005  Tate .......................... B60T 8/36
                                                    303/113.2

(Continued)

FOREIGN PATENT DOCUMENTS

EP    0958980 A2   11/1999
EP    2527183 A1   11/2012
(Continued)

*Primary Examiner* — Thomas W Irvin
(74) *Attorney, Agent, or Firm* — Arent Fox LLP; Michael Fainberg (57) ABSTRACT

The braking system includes a first and a second braking actuators associated with wheels of a respective axle or a respective bogie of a railway vehicle and to which there are connected a first electro-pneumatic control assembly and a second electro-pneumatic control assembly respectively, each comprising a charging solenoid valve and a discharging solenoid valve adapted to cause an increase and a reduction, respectively, of a pneumatic pressure supplied to the corresponding braking actuators, and a control unit arranged to control the electro-pneumatic control assemblies as a function of a target braking pressure, so that the assemblies cause the application of respective pressures to the corresponding braking actuators.

4 Claims, 9 Drawing Sheets

(51) Int. Cl.
*B60T 17/22* (2006.01)
*B60T 8/17* (2006.01)
*B60T 8/42* (2006.01)

(56) References Cited

U.S. PATENT DOCUMENTS

| | | | | |
|---|---|---|---|---|
| 7,182,411 | B2* | 2/2007 | Levy | B60T 13/665 |
| | | | | 303/22.1 |
| 8,197,013 | B2* | 6/2012 | Bradley | B60T 8/1705 |
| | | | | 303/3 |
| 8,512,208 | B2* | 8/2013 | Hilberer | B60T 7/20 |
| | | | | 188/3 R |
| 2007/0247000 | A1* | 10/2007 | Fugiel | B60T 7/16 |
| | | | | 303/122.08 |
| 2018/0297570 | A1* | 10/2018 | Tione | B60T 13/665 |

FOREIGN PATENT DOCUMENTS

| | | |
|---|---|---|
| FR | 2362034 A1 | 3/1973 |
| GB | 2401413 A | 11/2004 |
| JP | S5819102 A | 2/1983 |
| WO | 2013/182558 A2 | 12/2013 |

\* cited by examiner

REFERENCE ART

PNEUMATIC BRAKING SYSTEM FOR A RAILWAY VEHICLE

CROSS-REFERENCE TO RELATED APPLICATIONS

This application is the U.S. National Stage Application of International Patent Application No. PCT/IB2016/054473, filed on Jul. 27, 2016, which claims priority to Italian Patent Application No. 102015000038826, filed on Jul. 28, 2015, the contents of each of which is incorporated herein by reference in its entirety.

FIELD OF TECHNOLOGY

The present invention relates in a general way to a pneumatic braking system for a railway vehicle.

BACKGROUND

A pneumatic braking system may include:
first and second braking actuator means associated with the wheels of a respective axle or a respective bogie of the vehicle and to which there are connected a first electro-pneumatic control assembly and a second electro-pneumatic control assembly respectively, each comprising a charging solenoid valve and a discharging solenoid valve adapted to cause an increase and a reduction, respectively, of a pneumatic pressure supplied to the corresponding braking actuator means, and
a control unit arranged to control said electro-pneumatic control assemblies as a function of a target braking pressure, so that said assemblies cause the application of respective pressures to the corresponding braking actuator means;
said control unit being arranged to control said electro-pneumatic control assemblies so that respective braking pressure values, the sum of which at least approximately equals the value of the target braking pressure, are applied to the braking actuator means.

In a pneumatic braking system of this type, when an increasing pneumatic braking pressure is to be applied to the braking actuators, the charging solenoid valves of the aforesaid first and second electro-pneumatic control assemblies are successively energized, in a substantially simultaneous manner, in successive instants of time separated by a predetermined interval or period, according to predetermined closed-loop pressure control algorithms, executed independently for each braking actuator means but according to common set points, so as to cause successive increases in the pressures applied to the corresponding braking actuator means.

Similarly, when the pressure to the braking actuators is to be reduced, the discharging solenoid valves of the aforesaid first and second electro-pneumatic control assemblies are successively energized, in a substantially simultaneous manner, in successive instants of time, so as to cause successive decreases in the pressures applied to the corresponding braking actuator means.

As will be more fully apparent from the following text, in a system of this type the solenoid valves of the electro-pneumatic control assemblies are energized and de-energized a large number of times, which on the one hand limits their useful service life and, on the other hand, requires more frequent maintenance work.

EP 2 527 183 A1 and GB 2 401 413 A disclose known examples of pneumatic braking systems for railway vehicles.

According to EP 2 527 183 A1 an acquisition unit acquires the necessary braking force necessary for each car of a train containing a motor car, a braking force detection unit detects an electric braking force of the entire train, a braking force adjustment unit distributes the air braking force so that fluctuations in the electric braking force are compensated by the air braking force of one car, a braking force command unit sends a command to an air brake control device depending on the command value sent by the braking force adjustment unit and the air brake control device controls the air braking of the car in accordance with the command value.

According to GB 2 401 413 A a multi axle bogie railway vehicle braking system comprises a compressed air supply which supplies, via a first supply conduit and a second supply conduit and via respective inlet and exhaust valves, respective braking actuators. The supply conduits are connected to each other through a connection passage and a connection valve, whereby each pair of inlet and exhaust valves is able to selectively control either the respective braking actuator or both the braking actuators in order to reduce the total number of valve operations.

SUMMARY

An object of the present invention is therefore to provide a pneumatic braking system of the aforesaid type which can overcome the aforementioned drawbacks of the prior art systems.

This and other objects are achieved according to the invention with a pneumatic braking system for a railway vehicle as claimed herein.

As will be more fully apparent from the following text, in a braking system according to the present invention, the number of energizations of the solenoid valves of the first and second electro-pneumatic assemblies is drastically reduced.

This results in a significant prolongation of the useful service life of said solenoid valves, and a prolongation of the interval between successive operations for their maintenance.

BRIEF DESCRIPTION OF THE DRAWINGS

Further characteristics and advantages of the invention will be apparent from the following detailed description, provided purely by way of non-limiting example, with reference to the appended drawings, in which.

DETAILED DESCRIPTION OF EMBODIMENTS

Figure 1:
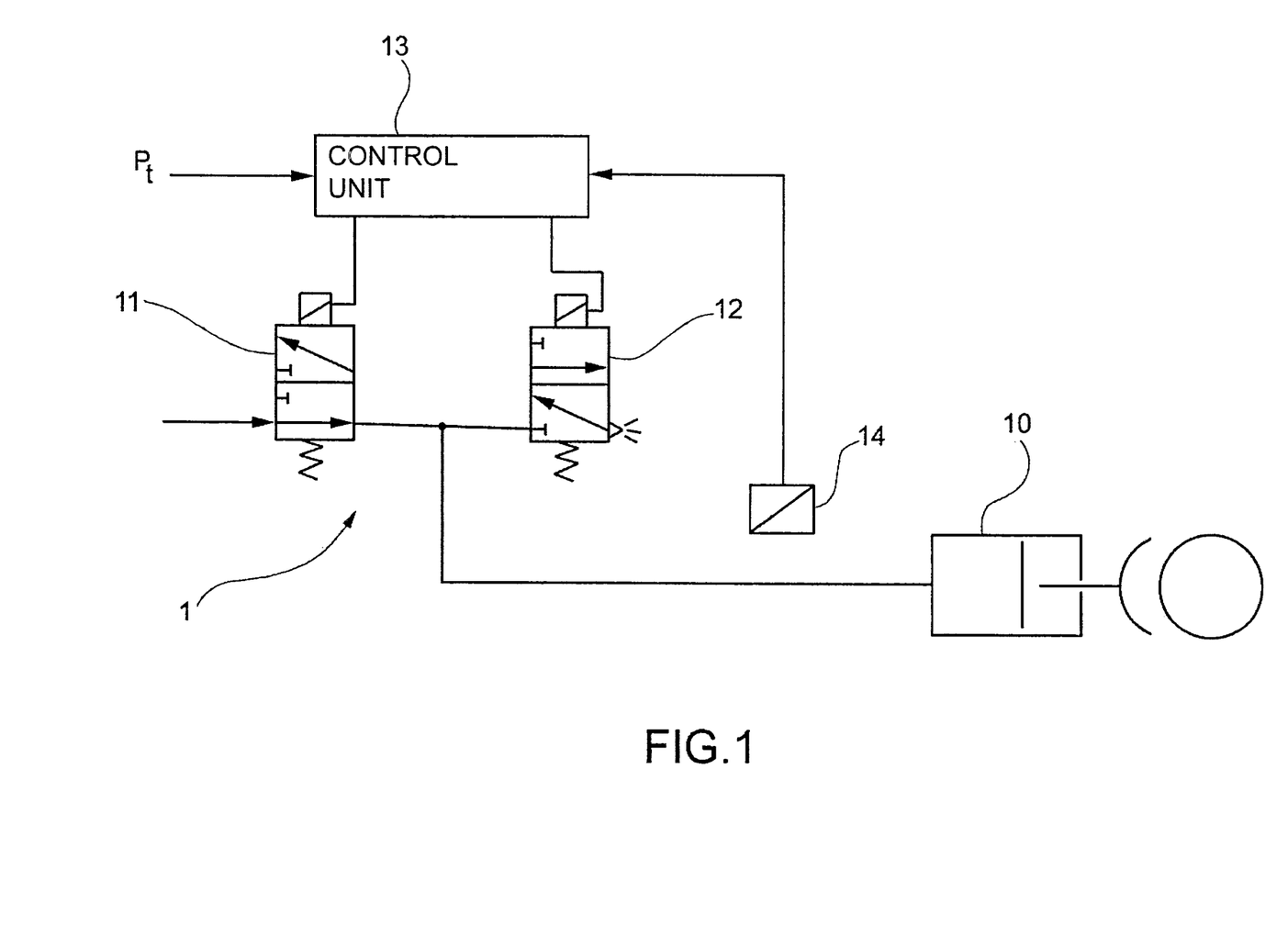
FIG. 1 is a diagram, partially in block form, of part of a pneumatic braking system for a railway vehicle.

FIG. 1 is a partial illustration of a braking system for a railway vehicle.

In this figure, the number 1 indicates an electro-pneumatic control assembly associated with a braking actuator (brake cylinder) 10.

The electro-pneumatic assembly 1 comprises a charging solenoid valve 11 and a discharging solenoid valve 12, also known as filling and emptying solenoid valves respectively, controlled by an electronic unit (ECU) 13, to cause an increase and a reduction, respectively, of a pneumatic braking pressure supplied to the brake cylinder 10.

A pressure sensor 14, associated with the outlet of the solenoid valve 11 or with the inlet of the brake cylinder 10, supplies the control unit 13 with a signal indicating the braking pressure applied to the brake cylinder 10.

The control unit 13 receives at its inlet a signal indicative of a target braking pressure $P_t$, as a function of which this unit controls the solenoid valves 11 and 12 according to predetermined modes.

The solenoid valves 11 and 12 are of the three-way, two-position type, and in the de-energized state they assume the condition shown in FIG. 1: the valve 11 allows a pressure to pass towards the brake cylinder 10, while the valve 12 is closed.

Figure 2:
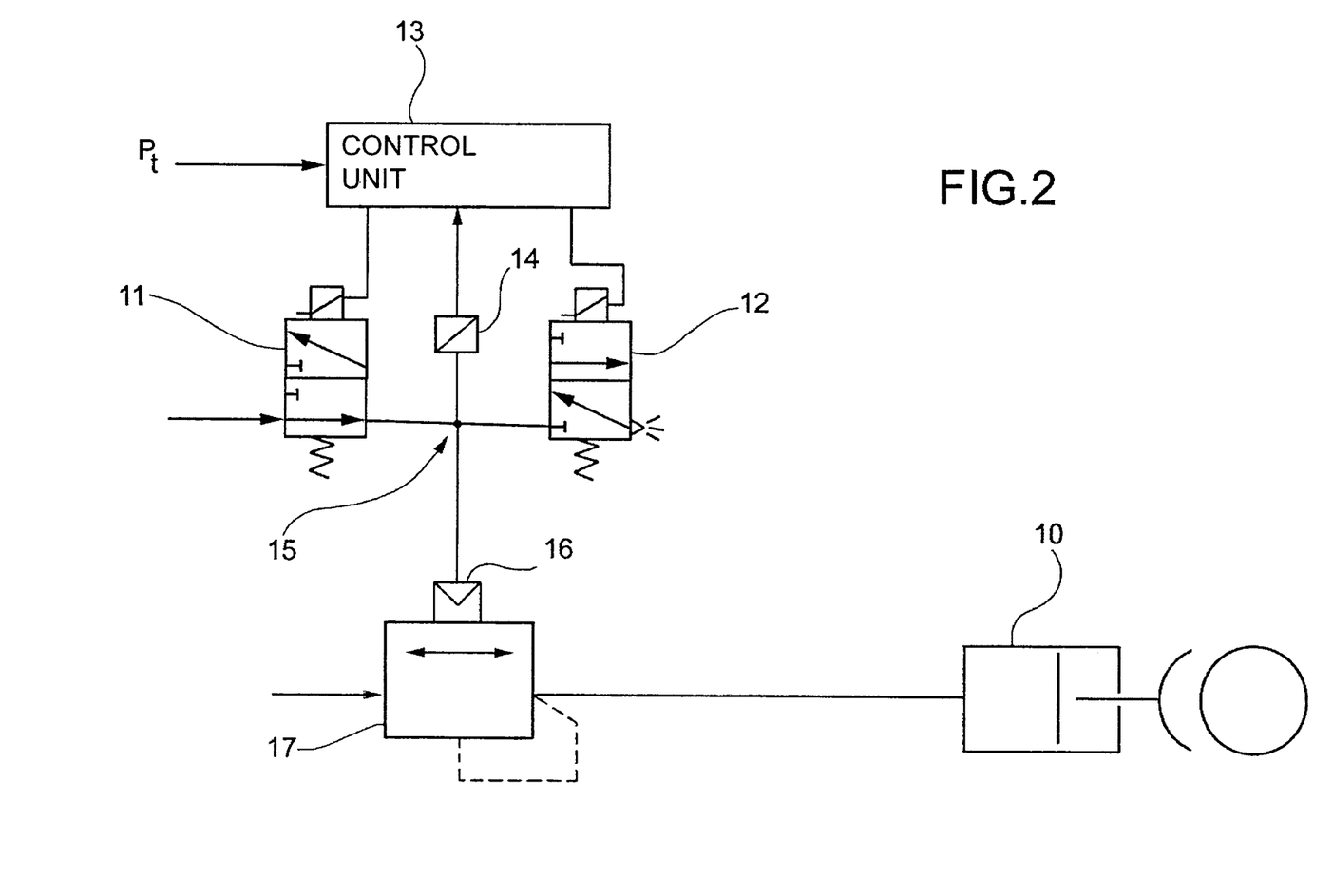
FIG. 2 is a diagram of a variant embodiment.

FIG. 2 shows another partial diagram of a braking system. In this drawing, parts and elements described previously have been assigned with the same symbols as those used previously.

In the diagram of FIG. 2, the outlet of the charging solenoid valve 11 and the inlet of the discharging solenoid valve 12 (branching point 15) are connected to the control chamber 16 of a relay valve 17, which receives at its inlet a pneumatic pressure which, at the outlet, is modulated by the pressure in the chamber 16, to apply a modulated braking pressure to the inlet of the brake cylinder 10.

In the diagrams of both FIGS. 1 and 2, the control unit 13 controls the solenoid valves 11 and 12 in a pulsed manner by means of a suitable closed-loop control algorithm, so that the pressure at the inlet of the brake cylinder 10 is at least approximately equal to the value of the target braking pressure $P_t$.

Figure 3:
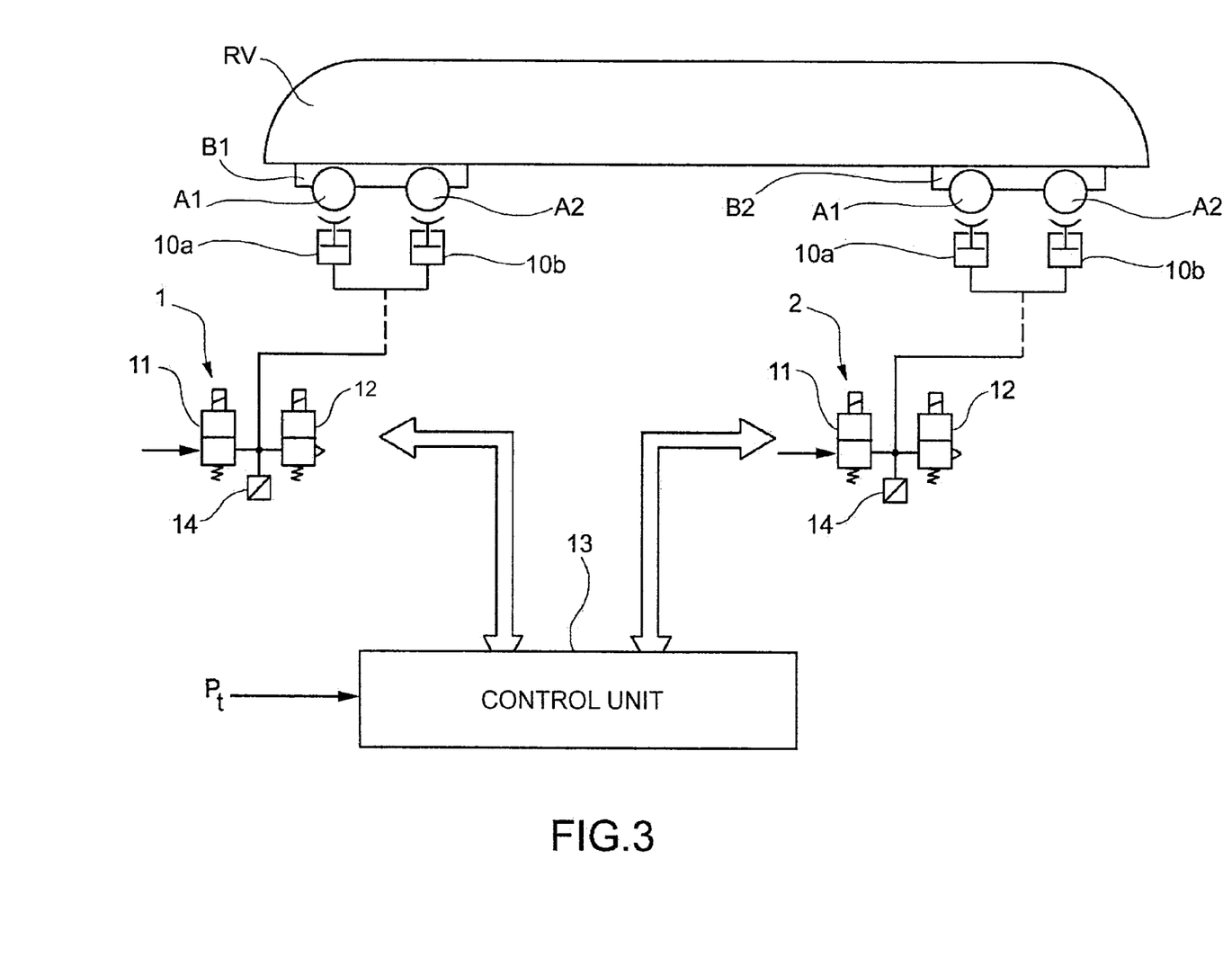
FIG. 3 is a schematic representation of a pneumatic braking system for a railway vehicle according to the present invention.

The simple diagrams of FIGS. 1 and 2 may be supplemented to produce a pneumatic braking system in which the braking pressure is controlled bogie by bogie, as shown in FIG. 3. In this drawing also, parts and elements described previously have again been identified with the same references as those used previously.

FIG. 3 shows schematically a railway vehicle RV having two bogies B1 and B2, each comprising two axles A1 and A2, with which respective brake cylinders 10a and 10b are associated.

The brake cylinders associated with the axles of bogie B1 are controlled by an electro-pneumatic control assembly 1, as described above, while the brake cylinders relating to the axles of bogie B2 are controlled by an equivalent but independent electro-pneumatic assembly 2.

The two electro-pneumatic control assemblies 1 and 2 are controlled by the same control unit 13 as a function of the value of a target braking pressure $P_t$.

In the diagram according to FIG. 3, the "bogie by bogie" braking control is implemented without the use of relay valves, that is to say according to the principle diagram described above with reference to FIG. 1. Clearly, the braking control can also be implemented according to a diagram providing for the use of two relay valves, controlled by the electro-pneumatic assemblies 1 and 2, according to the schematic diagram described above with reference to FIG. 2.

In the diagram according to FIG. 3, the target braking pressure $P_t$ is equal to the target braking force to be applied simultaneously to each bogie B1 and B2.

Figure 4:
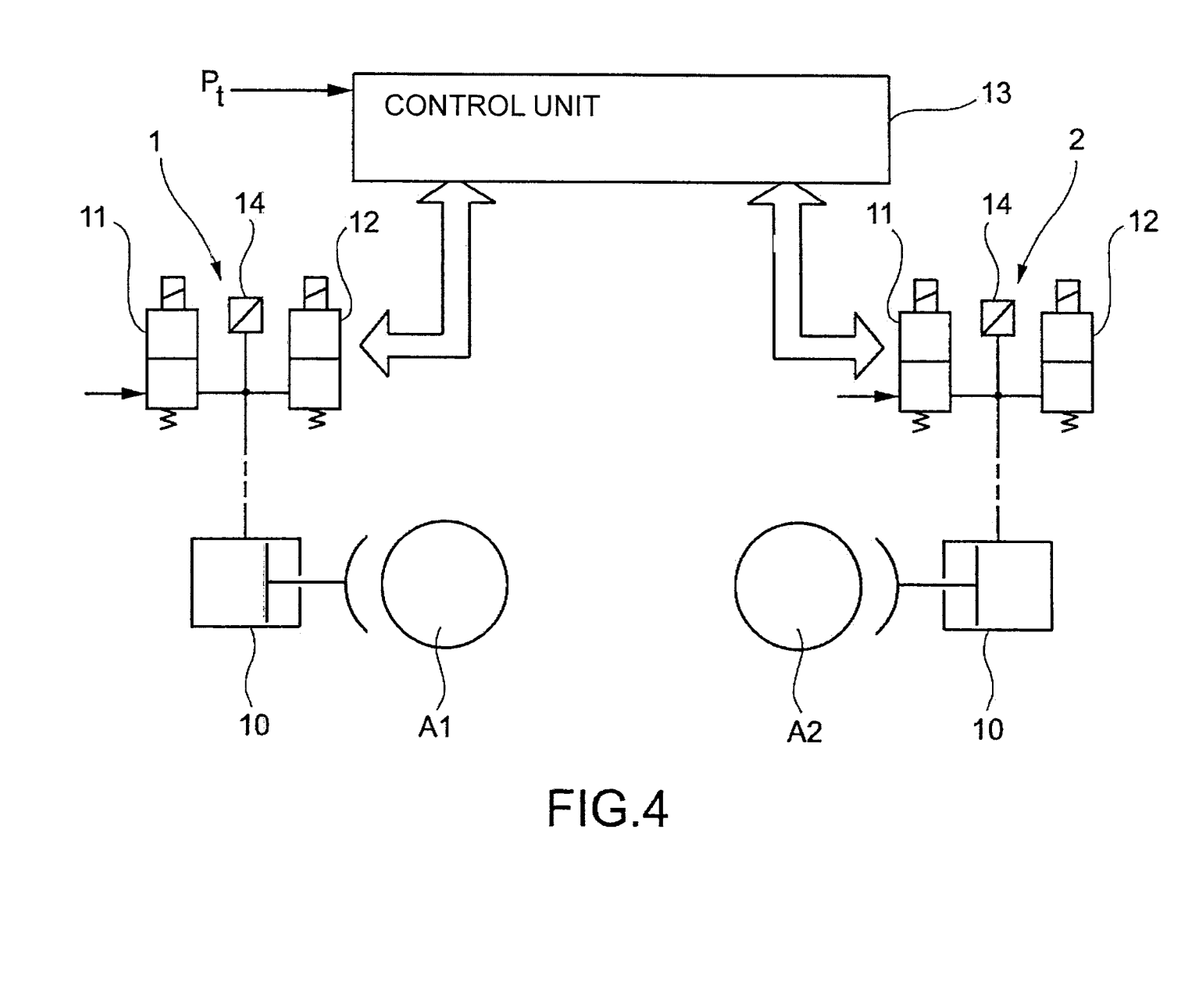
FIG. 4 shows a variant of the system according to FIG. 3.

As an alternative to the configuration according to FIG. 3, and as partially illustrated in FIG. 4, the braking control may be implemented in an "axle by axle" mode. In this case, the target braking pressure $P_t$ represents the request for braking force to be applied to the individual bogie.

In FIG. 4, parts and elements described previously have again been identified by the same reference symbols as those used previously.

In the diagram according to FIG. 4, in a given bogie comprising two axles A1 and A2, the respective braking element 10 is associated with each axle, and the braking pressure applied thereto is controlled by means of a respective electro-pneumatic assembly 1 or 2, as described above.

The control unit 13 of FIG. 4 is arranged to convert, on the basis of a predetermined algorithm, the target braking pressure request to be applied to the associated bogie into a pressure value to be applied to the brake cylinders 10 of the two axles A1 and A2 of this bogie. This pressure value is generally the same for the two axles, and is normally controlled by means of what is known as a "dead band", required in closed-loop control to make the control stable by preventing continual oscillations around the target value. The amplitude of what is known as the "dead band" is normally chosen to be equal to, or close to, the maximum acceptable error in the pressure control system.

Although substantially the same braking pressure value has to be applied to both of the axles, the electronic unit 13 controls the electro-pneumatic control assemblies 1 and 2 in such a way as to control these assemblies 1 and 2 in a completely independent manner. This approach is justified by the need to modulate the braking pressure independently between the two axles, for example during the occurrence of wheel slip, where there is poor adhesion of the wheels to the rails.

It can be shown that, except in the case of wheel slip, for equal values of braking pressure to be applied to the axles, the control unit 13 controls the solenoid valves 11 and 12 of the two electro-pneumatic assemblies 1 and 2 with the same number of energization pulses on average. A similar consideration is relevant in the case of the system shown in FIG. 3, when the volumes of the brake cylinders associated with the two bogies B1 and B2 are equal and when the braking pressure to be applied to the two bogies B1 and B2 is the same.

As mentioned in the introductory part of the present description, the invention is intended to reduce the number of energization pulses to be supplied to the solenoid valves of the electro-pneumatic assemblies 1 and 2 associated with two bogies of a vehicle (as in the diagram of FIG. 3), or with the two axles of the same bogie (as in the diagram of FIG. 4).

This is done in the way which will now be described in detail with reference to FIGS. 5 to 9.

The following description relates to "axle by axle" control, that is to say control in accordance with the diagram of FIG. 4. However, the ensuing description is also true, mutatis mutandis, for "bogie by bogie" control.

Figure 5:
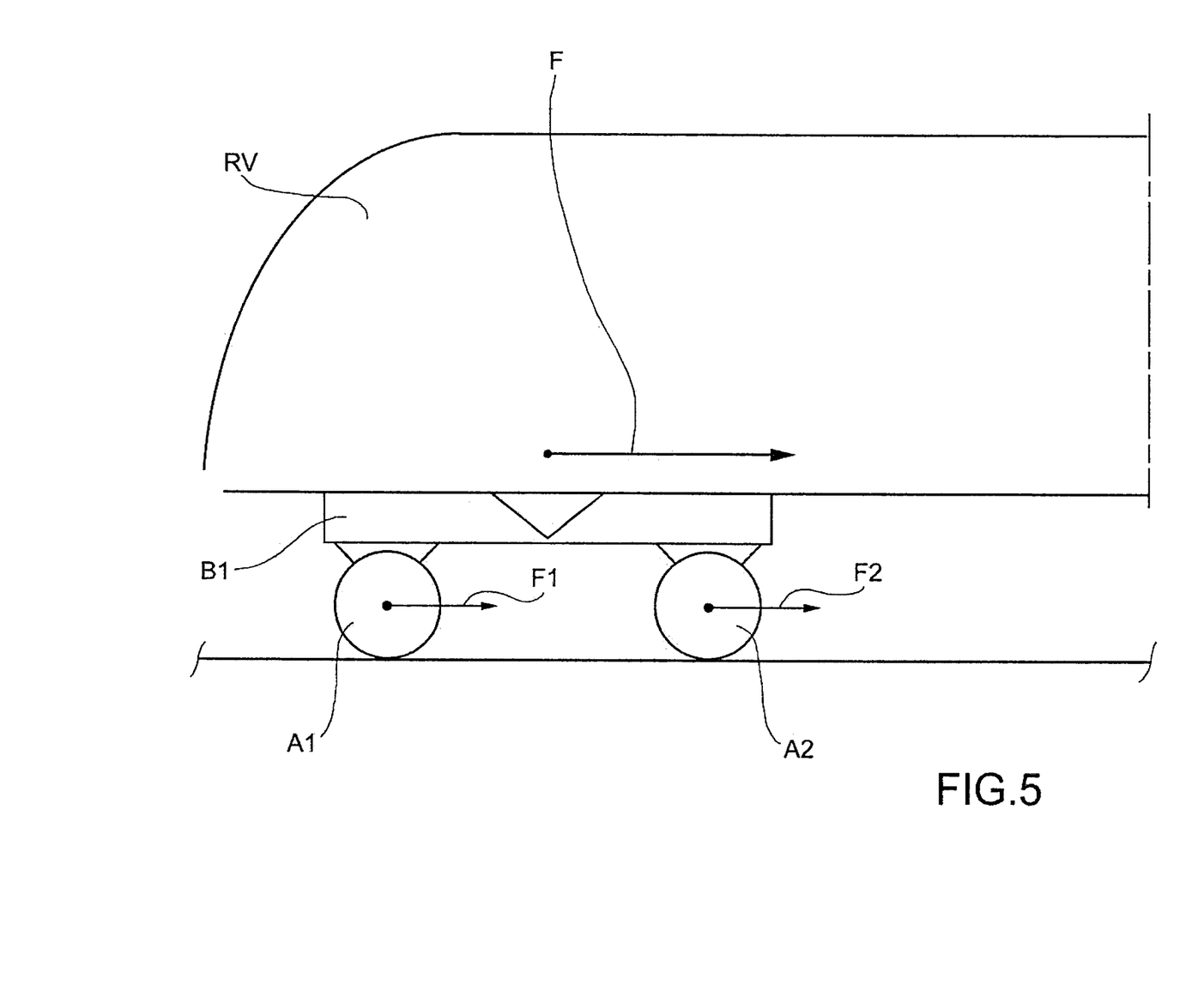
FIG. 5 is a partial schematic representation of a railway vehicle.

With reference to FIG. 5, the braking force F(t) transmitted in the time (t) from the bogie B1 to the vehicle RV is the result of the sum of the two braking forces F1(t) and F2(t) exerted by the individual axles A1 and A2 of the bogie as a consequence of the braking action applied to them by the associated brake cylinders; that is to say, $$F(t)=F1(t)+F2(t) \qquad (1)$$

To obtain a determined braking force F(t), it is not necessary for F1(t)=F2(t)=F(t)/2 to be true at all times; that is to say, it is not necessary for the same braking pressure value to be applied to the brake cylinders of both axles of the bogie.

Instead, it is simply necessary that equation (1) above is true for any value of F1(t)≤F(t), provided that the value of F1(t) does not exceed the value of the adhesion force available for the axle A1, otherwise wheel slip may occur.

Similarly, equation (1) is true for any value of F2(t)≤F(t), provided that the value of F2(t) does not exceed the value of the adhesion force available for the axle A2, for the reason given above.

The control unit 13 is arranged to control the electro-pneumatic assemblies 1 and 2 associated with the brake cylinders of the axles A1 and A2 by means of energization pulses applied periodically to the solenoid valves of these assemblies, with a period T.

If, in the course of the control at a given instant, corresponding to the (n+1)-th period T, according to the assigned braking pressure target $P_t$ the bogie B1 must apply to the vehicle RV a new value of force F(n+1)=F(n)+ΔF(n+1), where ΔF(n+1) is the force increase to be applied relative to the preceding value of force F(n), it is unnecessary to use a balanced increase F1(n+1)=F2(n+1)=[F(n)+ΔF(n+1)]/2; instead, the whole increase may simply be applied to only one of the two axles, for example the axle A1, in which case $$F(n+1)=[F1(n)+\Delta F(n+1)]+F2(n) \qquad (2),$$

or the whole increase may be assigned to the axle A2, in which case $$F(n+1)=F1(n)+[F2(n)+\Delta F(n+1)] \qquad (3).$$

The force value F(n) corresponds to a pressure value P(n)·K, where K is a constant that "summarizes" all the mechanical parameters of conversion from force to pressure, namely the surface area of the piston of the brake cylinder, the lever ratio of the caliper, the coefficient of friction of the brake pads, etc.

Substituting the equivalent pressure values P for the force F, equations (2) and (3) can be rewritten as follows:

$$P(n+1)=[P1(n)+\Delta P(n+1)]+P2(n) \qquad (4),$$

$$P(n+1)=P1(n)+[P2(n)+\Delta P(n+1)] \qquad (5).$$

In a braking system according to the invention, the control unit controls successive variations ΔF(n+1), ΔF(n+2), ΔF(n+m), . . . applied to a bogie, corresponding to successive pressure variations ΔP(n+1), ΔP(n+2), ΔP(n+m), . . . , alternately using at each variation equation (4) and equation (5) as shown above, according to the following sequence:
for t=nT: P(n)=P1(n)+P2(n)
for t=(n+1)T: P(n+1)=[P1(n)+ΔP(n+1)]+P2(n)
 where [P1(n)+ΔP(n+1)]=P1(n+1)
for t=(n+2)T: P(n+2)=P1(n+1)+[P2(n)+ΔP(n+2)]
 where [P2(n)+ΔP(n+2)]=P2(n+2)
for t=(n+3)T: P(n+3)=[P1(n+1)+ΔP(n+3)]+P2(n+2)
 where [P1(n+1)+ΔP(n+3)]=P1(n +3)
for t=(n+4)T: P(n+4)=P1(n+3)+[P2(n+2)ΔP(n+4)]
 where [P2(n+2)+ΔP(n+4)]=P2(n+4)
and so on.

Figure 6:
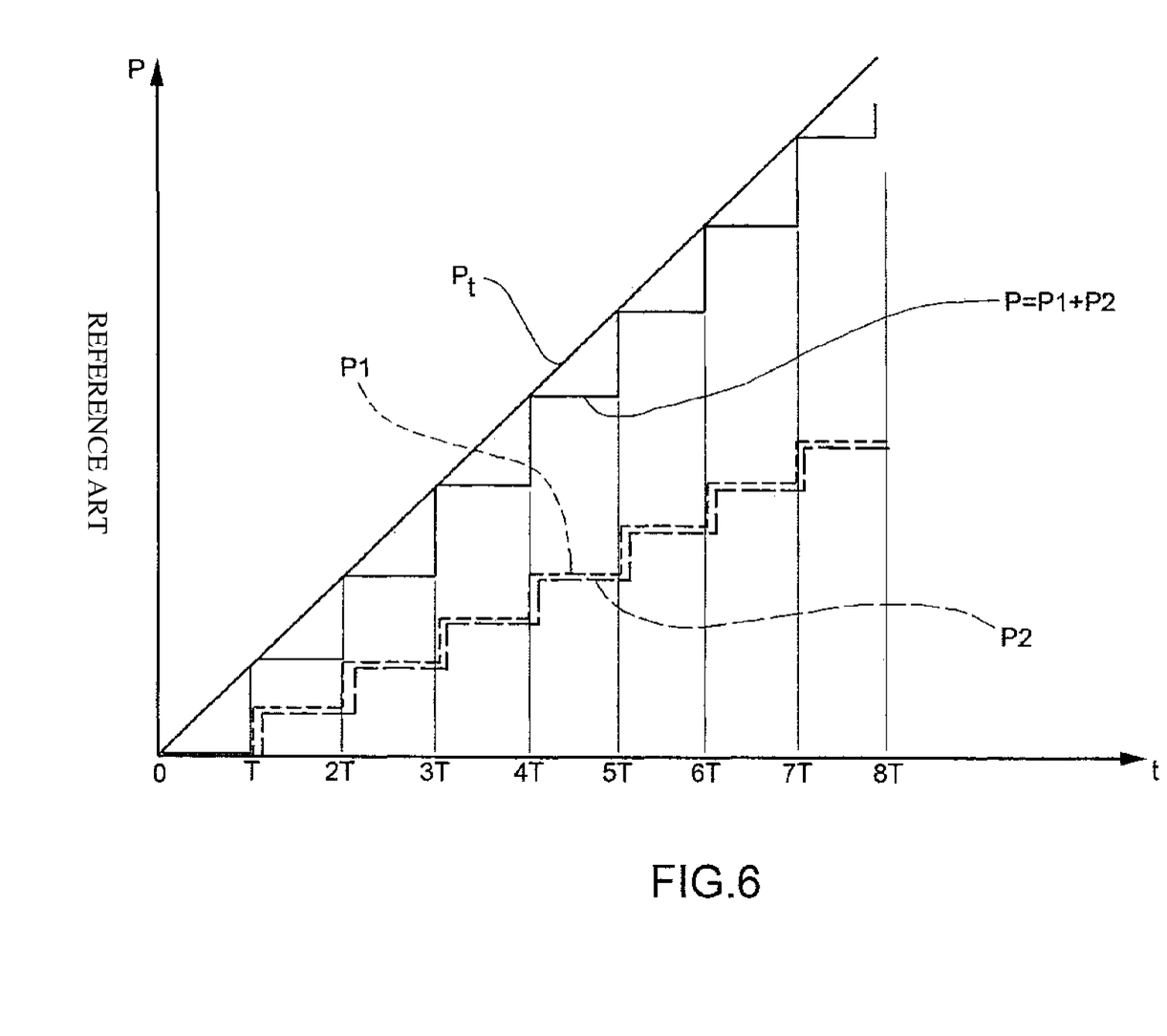
FIG. 6 is a diagram which shows, as a function of the time t shown on the horizontal axis, examples of the trends of pressures in a pneumatic braking system according to the prior art.

A time diagram is provided in FIG. 6, showing pressure trends on the vertical axis, as a function of the time t shown on the horizontal axis.

FIG. 6 shows a control mode for controlling the electro-pneumatic control assemblies associated with the two axles of a bogie, according to the prior art.

In this figure, the ascending continuous line $P_t$ represents the assigned target braking pressure, proportional to the total force to be applied to the bogie.

The short-dashed line P1 and the long-dashed line P2 represent the trends of the target braking pressures to be applied to the brake cylinders associated with axle A1 and axle A2 respectively.

In each updating period with a duration of T, these pressures are both increased by the value ΔP/2.

The continuous stepped line P represents the sum of the two pressures P1 and P2, and equals the value of the target braking pressure $P_t$ at the end of each updating period with a duration of T.

Clearly, the shorter the updating period T, the more closely the resultant pressure P will approximate the trend of the target pressure $P_t$.

However, according to the prior art of the type illustrated above with reference to FIG. 6, the charging solenoid valves of the two electro-pneumatic control assemblies are both energized in each updating period T.

In a braking system according to the invention, the control unit 13 is arranged to control the solenoid valves of the electro-pneumatic assemblies 1 and 2 in the way which will now be described with reference to FIG. 7. In this figure, the symbols $P_t$, P, P1 and P2 have the same meanings as those defined above in the description of FIG. 6.

Figure 7:
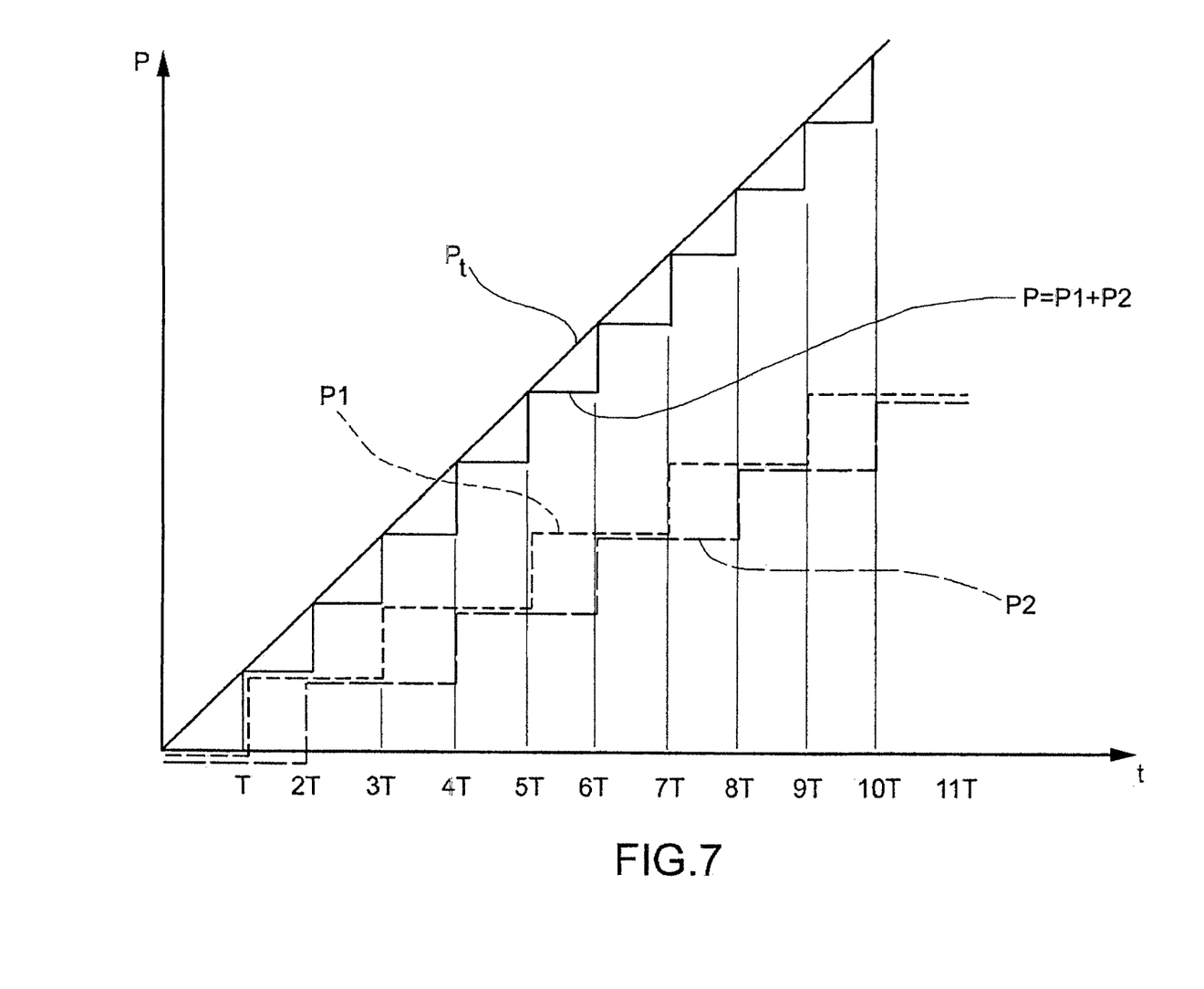
FIG. 7 is a diagram similar to that shown in FIG. 6, and shows the operating mode of a pneumatic braking system according to the present invention.

As can be seen in FIG. 7, according to the invention the control unit 13, in the successive updating periods with a duration of T, alternately energizes the charging solenoid valve of the first electro-pneumatic assembly 1 and the charging solenoid valve of the second electro-pneumatic assembly 2.

In other words, in a generic updating interval or period with a duration of T, the braking pressure associated with one axle of the bogie is kept at the preceding value, while the value of the braking pressure applied to the other axle is increased. This can be done by alternately modifying the pressure set points for the charging solenoid valves of the two electro-pneumatic assemblies 1 and 2.

As can be seen by comparing FIGS. 6 and 7, the total pressure P=P1+P2 in the control according to FIG. 7 exhibits essentially the same trend as that exhibited in the control according to FIG. 6, but the number of energizations of the solenoid valves of the two electro-pneumatic assemblies 1 and 2 is substantially halved.

In this way the service life of said solenoid valves is substantially doubled, and the intervals between successive maintenance operations are essentially halved.

Figure 8:
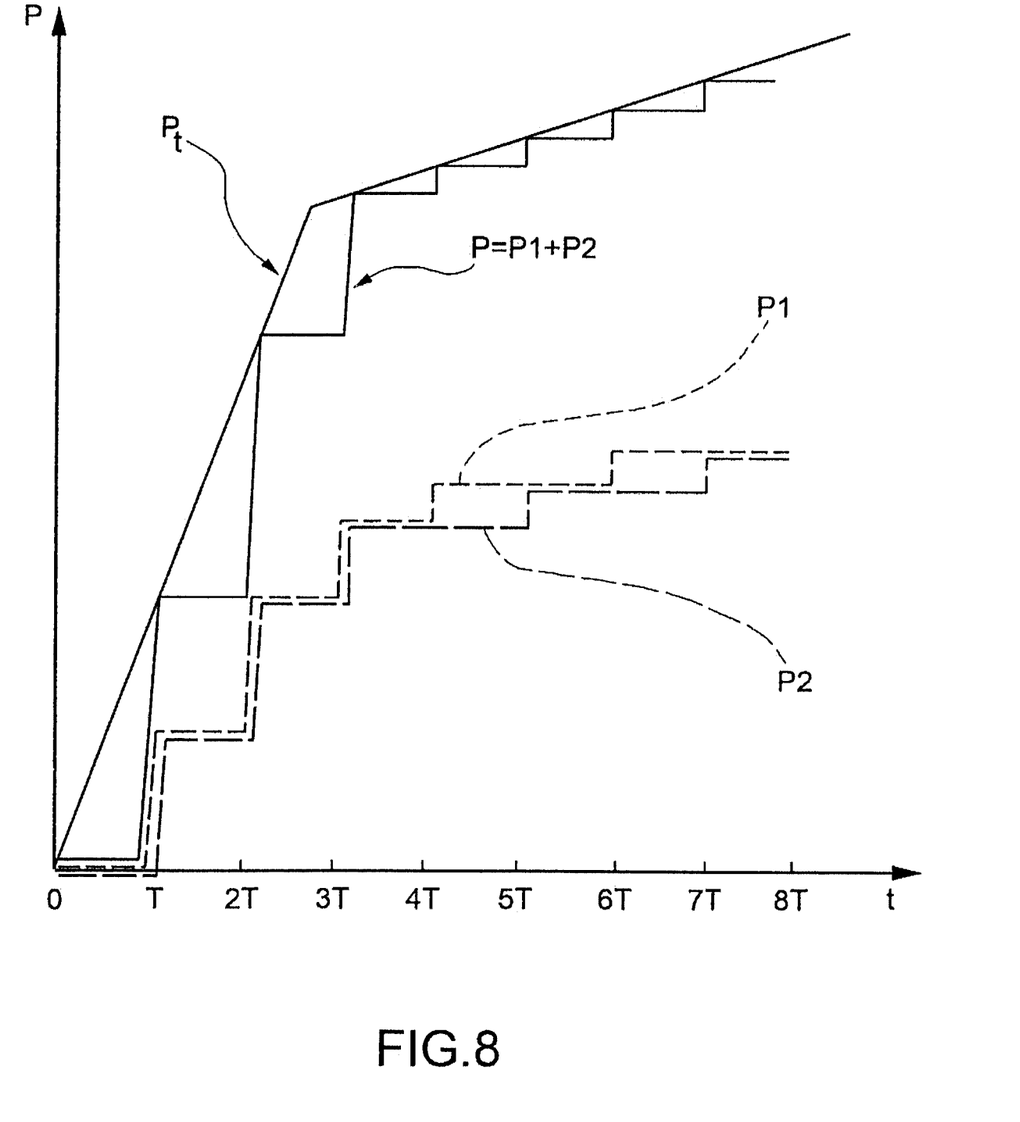
FIGS. 8 and 9 are diagrams similar to that shown in FIG. 7, and show the pressure trends in two different modes of actuation of systems according to the present invention.

When the trend of the target braking pressure $P_t$ has a rather high slope, as in the initial portion of FIG. 8, the increases in braking pressure ΔP to be applied in each updating interval or period with a duration of T may reach rather high values. In each period T, the application of a rather high pressure increase to a single axle of the bogie may cause excessive unbalancing of the forces acting longitudinally on the bogie.

In such a situation, as shown in the diagrams of FIG. 8, when the trend of the target pressure $P_t$ has a rather high slope, above a predetermined value, the control unit 13 can essentially operate in the way described previously with reference to FIG. 6, with equal increases ΔP/2 imparted simultaneously to the braking elements of the two axles.

When the slope of the trend of the target pressure $P_t$ subsequently falls below the predetermined value, as shown in the right-hand part of FIG. 8, the control unit 13 implements the control of the braking pressures as described above with reference to FIG. 7, that is to say by alternately applying the pressure increases to the braking elements of one and the other axle.

Overall, even in a situation of the type shown in FIG. 8, the system according to the invention can provide an appreciable reduction in the number of energizations of the solenoid valves of the two electro-pneumatic control assemblies.

Figure 9:
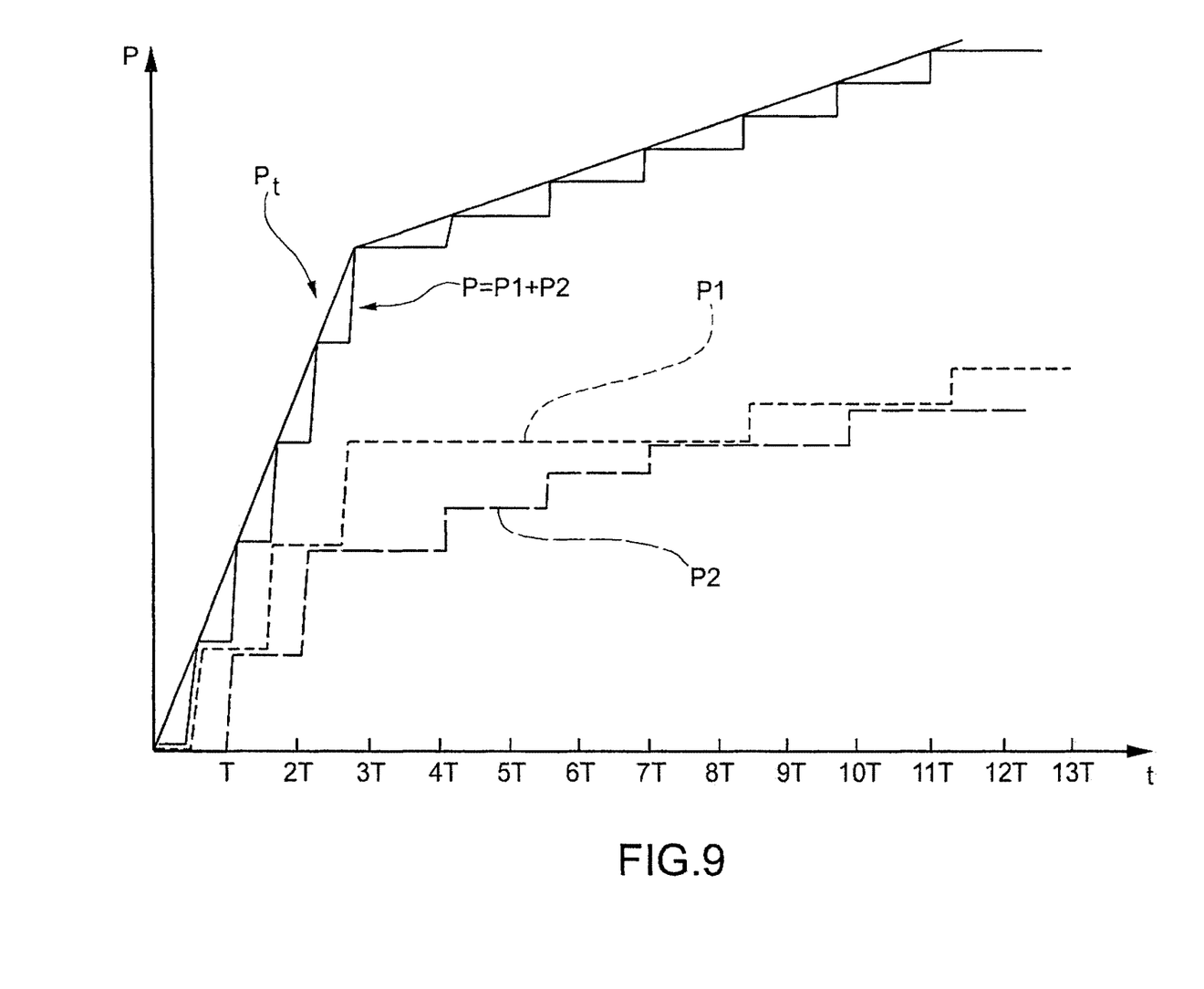

FIG. 9 shows trends of the pressures in an alternative variant to that illustrated with reference to FIG. 8.

In the variant according to FIG. 9, when the trend of the target braking pressure $P_t$ has a slope above the predetermined value, the control unit 13 still controls the solenoid valves of the two electro-pneumatic control assemblies 1 and 2 in an alternate way, but with a reduced updating period (equal to T/2 in the example of FIG. 9): the pressure increases that are alternately applied to the braking elements of the two axles are correspondingly reduced in size.

As soon as the slope of the target braking pressure $P_t$ falls below the aforesaid predetermined value, the control unit 13 keeps the higher pressure (P1 in FIG. 9) stable and, by successive increases, brings the high pressure (P2) to a value equal to the first (P1), with an updating period equal to, or if necessary greater than, T.

After the two pressures P1 and P2 have been equalized with one another, the control unit 13 recommences the alternate control of the two electro-pneumatic control assemblies 1 and 2, substantially as described with reference to FIG. 7.

Evidently, the above description is applicable, mutatis mutandis, to the case in which the target braking pressure $P_t$ is descending.

Clearly, the principle of the invention remaining unchanged, the forms and the details of embodiment can be varied widely from those described and illustrated herein purely by way of non-limiting example, without thereby departing from the scope of protection of the invention as defined by the attached claims.

The invention claimed is:

1. A pneumatic braking system for a railway vehicle, including first and second braking actuators associated with wheels of a respective axle or a respective bogie of the railway vehicle and to which there are connected a first electro-pneumatic control assembly and a second electro-pneumatic control assembly respectively, which first and second electro-pneumatic control assemblies are independent of each other and comprise each a charging solenoid valve and a discharging solenoid valve adapted to cause an increase and a reduction, respectively, of a pneumatic pressure supplied to the corresponding first or second braking actuators, and a control unit arranged to control said first and second electro-pneumatic control assemblies as a function of a target braking pressure, such that said first and second electro-pneumatic control assemblies cause the application of respective pressures to the corresponding first or second braking actuators;

said control unit being arranged to control said first and second electro-pneumatic control assemblies so that respective braking pressure values, the sum of which substantially equals the value of the target braking pressure, are applied to the first and second braking actuators;

wherein the control unit is arranged to control, at least for a predetermined time interval, said first and second electro-pneumatic control assemblies in an alternate manner, so as to cause, in subsequent time instants separated by a predetermined interval, alternately a variation of the pressure value applied to the first braking actuator and the value of the pressure applied to the second braking actuator.

2. The pneumatic braking system of claim 1, wherein the duration of said predetermined time interval is variable as a function of the speed of variation of the target braking pressure.

3. The pneumatic braking system of claim 1, wherein the control unit is arranged to control said first and second electro-pneumatic control assemblies in a synchronous manner when the speed of variation of the target braking pressure exceeds a predetermined value.

4. The pneumatic braking system of claim 1, wherein the control unit is arranged to control said first and second electro-pneumatic control assemblies so as to substantially equalize the values of the pressures applied to the first and second braking actuators when the speed of variation of the target braking pressure is lower than a predetermined value.

\* \* \* \* \*